Patented Jan. 17, 1933

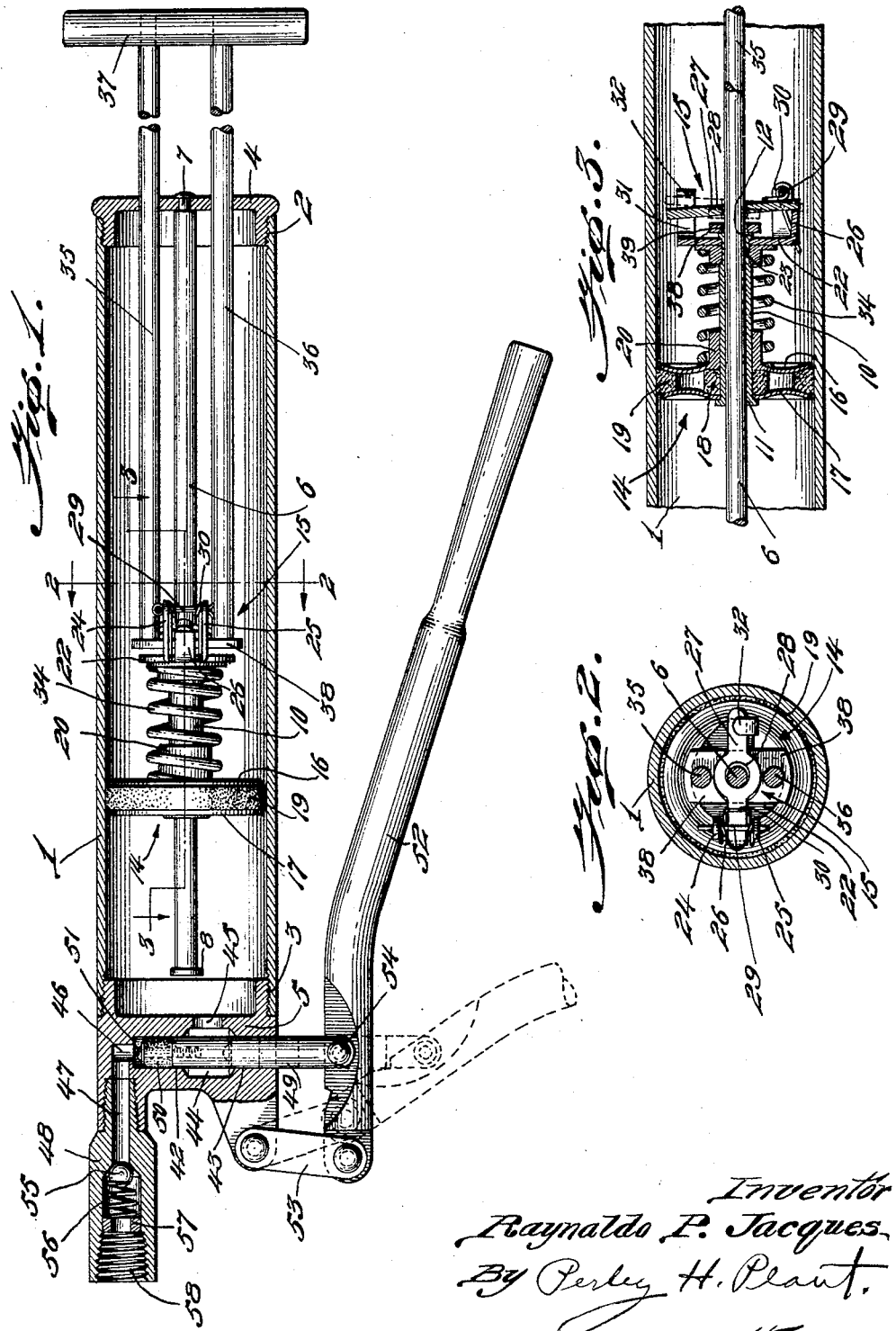

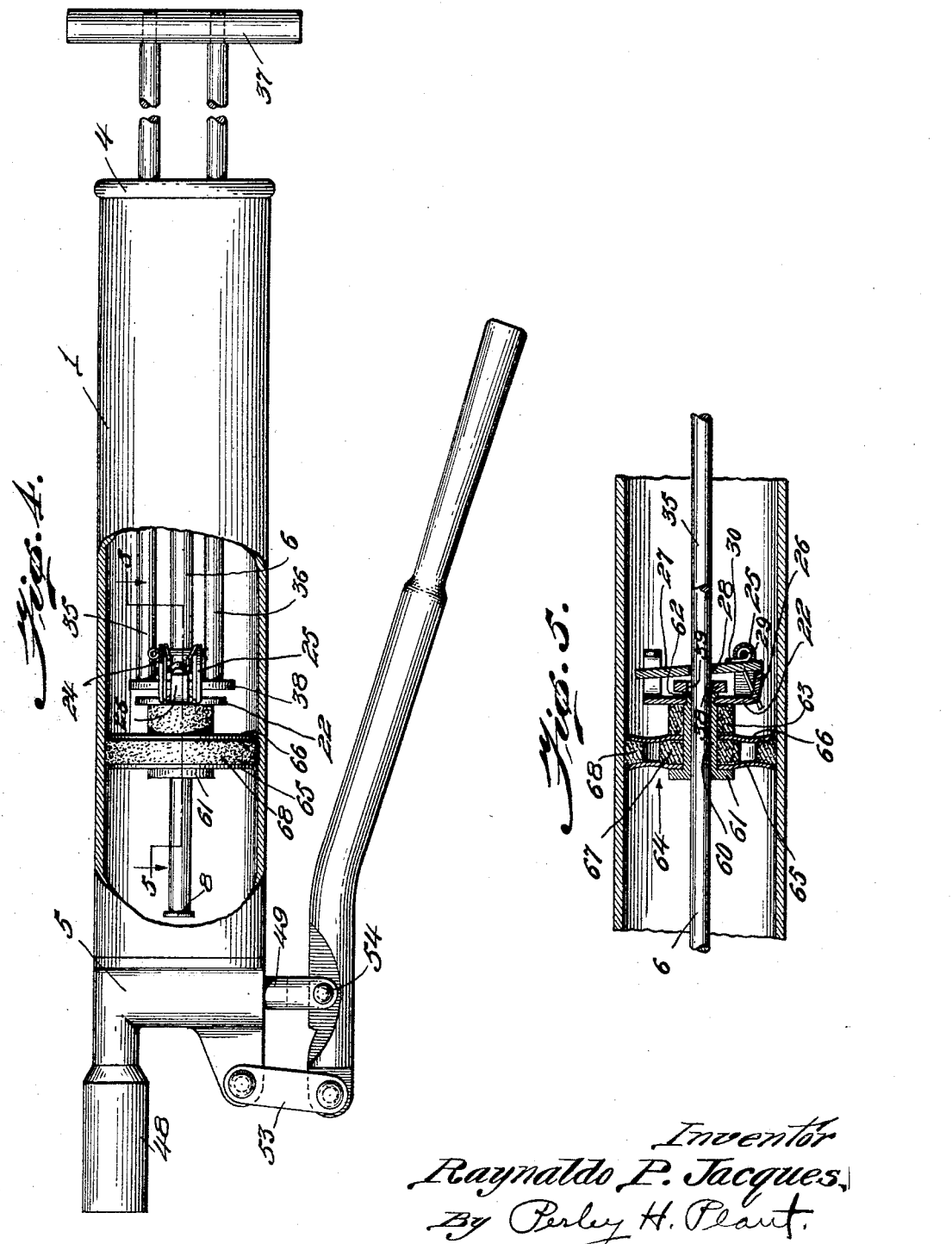

1,894,274

UNITED STATES PATENT OFFICE

RAYNALDO P. JACQUES, OF WOONSOCKET, RHODE ISLAND

LUBRICATING APPARATUS

Application filed August 22, 1930. Serial No. 476,989.

This invention relates to a lubricating apparatus of the type which comprises a lubricant chamber, which may be of cylindrical form, in which the lubricant is constantly maintained under moderate pressure, and a high pressure lubricant chamber which communicates with and receives lubricant from the first named lubricant chamber, and which is provided with means for exerting a relatively high pressure upon the lubricant for forcing the same through suitable connecting means to a bearing to be lubricated.

One object of my invention is the provision of improved means for subjecting the lubricant in the main lubricant chamber to a substantially constant pressure, and for rendering such pressure substantially constantly effective, without renewal after each expulsion of lubricant from the high pressure chamber.

A further object of the invention is the provision of an improved piston head for maintaining pressure upon the lubricant in the main lubricant chamber, and an improved form of lock mechanism for preventing retraction of the piston from its pressing engagement with the lubricant.

Another object of the invention is the provision of an improved form of piston which may be made up of separately movable cooperating elements so constructed and arranged as to permit relative movement therebetween in maintaining pressure on the lubricant, and adapted for relative movement to force expansive gasket members into position whereby increased pressure on the lubricant serves to increase automatically the closeness of the sliding engagement between the piston and the cylinder wall as well as between the piston and the guide member to prevent escape of lubricant past the piston.

Another object of the invention is the provision of a compact form of combined piston and locking means therefor located entirely within the cylinder and thus protected against injury while the apparatus is in use.

Another object of the invention is to provide an improved high pressure chamber and plunger for more effectively delivering the lubricant to the bearings under pressure.

Other objects and advantages of the invention relate to various improved details of construction and novel arrangements of the parts as will be more fully set forth in the detailed description to follow.

Referring to the drawings:—

Fig. 1 is a longitudinal sectional view taken through the cylindrical lubricant chamber and the high pressure chamber, showing the position of the operating mechanisms, Fig. 2 is a transverse sectional view taken along the line 2—2 of Fig. 1, Fig. 3 is a longitudinal sectional view taken substantially along the line 3—3 of Fig. 1, Fig. 4 is an elevational view of a lubricating apparatus, a part of the piston cylinder being broken away to show a somewhat modified form of piston mechanism, and, Fig. 5 is a detail sectional view taken substantially along the line 5—5 of Fig. 4.

In the embodiment of the invention shown in Figs. 1 to 3 of the drawings 1 designates a cylindrical shell, the opposite ends of which are threaded as indicated at 2 and 3 for securing thereto a closure cap 4 and a high pressure chamber casing 5. The cap 4 has a guide member 6 secured thereto as at 7 and adapted to lie within the cylindrical shell 1 when the parts are in assembled position. The guide member 6 is provided with an enlarged head 8 located adjacent to that end of the guide member most remote from the closure cap 4.

A piston sleeve 10 is slidably mounted upon the guide member 6 and is provided with enlarged end portions 11 and 12 located adjacent to the opposite ends thereof which serve as stops for the piston 14 and a lock mechanism 15. The piston 14 comprises a pair of piston cups 16 and 17 which are each curved throughout a circular path so that the central and peripheral portions thereof are spaced from each other a greater distance than the parts located intermediate the central and peripheral portions. The piston cups 16 and 17 are slidably mounted on the piston sleeve 10 and are separated from each other by inner and outer annular washers 18 and 19 which washers may be formed of leather, rubber, fibre or other suitable material which is preferably of such a nature as to be slightly compressible whereby under the influence of pressure exerted thereon by the piston cups the washers may be compressed somewhat and thus caused to expand radially to fit more closely against the outer wall of the piston sleeve 10 and the inner wall of the cylinder. The piston cup 16 may be provided with a central sleeve 20 formed integral therewith or secured thereto and mounted upon the piston sleeve 10 to prevent any tilting of the cup 16 relative to the piston sleeve 10.

The lock mechanism 15 comprises a base plate 22 which is mounted upon the reduced shouldered end 23 of the piston sleeve 10 in such a manner as to prevent movement of the lock mechanism longitudinally of the sleeve 10, and has opposed upstanding lugs 24 and 25, spaced from each other, and an abutment 26 located intermediate said lugs and adapted to engage one end of a latch member 27. The latch member 27 is provided with a central opening 28 to receive the guide member 6. The central opening 28 is formed with sharp edges which engage opposite sides of the guide member 6, as shown in Fig. 3 of the drawings, whereby the piston sleeve 10 is locked against movement relative to the guide member in one direction, when the latch member 27 occupies the position shown in full lines in Fig. 3 of the drawings. A pin 29 is passed through the opposed lugs 24 and 25 above the latch member 27 and carries a coiled spring 30 adapted to bear against the latch member 27 between the abutment 26 and the guide member 6 whereby the latch member is normally held in the position shown in full lines in Fig. 3 of the drawings. A keeper member 31 carried by the base plate 22 is provided with an inturned end 32 which is adapted to engage the end of the latch member 27 upon movement of the latch member 27 out of its full line position as shown in Fig. 3 before the latch member is moved a sufficient distance to grip the guide member 6 in the opposite direction from that shown in full lines in Fig. 3 of the drawings.

A coiled spring 34 surrounds the piston sleeve 20 and engages the piston cup 16 and base plate 22 to normally force the piston downwardly in the cylindrical sleeve or against the lubricant contained in the cylindrical chamber.

Parallel rods 35 and 36 are slidably mounted in the cap 4 and are connected to each other outwardly of the cap by a handle 37. A crosshead 38 connects the inner ends of the rods 35 and 36, and the crosshead 38 is provided with an opening 39 adapted to receive loosely the guide member 6.

The high pressure casing 5 has a transverse cylindrical passage which comprises reduced portions 42 and 43 and an enlarged portion 44, and a longitudinal passage 45 connects the enlarged portion 44 with the lubricant chamber within the cylindrical shell 1. A passage 46 connects the end of the reduced portion 42 of the transverse passage with a central passage 47 in a connection 48. A plunger 49 is slidably mounted in the transverse cylindrical passage and is provided with an end washer or gasket 50 secured to the end of the plunger by a screw 51 or any other suitable means. An operating lever 52 is connected to the high pressure casing 5 by means of a link 53 and is pivotally connected to the plunger 49, as at 54, whereby the plunger 49 may be reciprocated in the transverse passage.

A check valve 55 is carried by the connection 48 and supported by a coiled spring 56 which is in turn seated upon an internal shoulder formed by a collar 57 carried by the connection 48 whereby lubricant may be forced into the connection 48 by movement of the plunger.

In the operation of the device the high pressure casing 5 may be disengaged from the cylindrical shell 1 and the open end of the shell inserted in the lubricant with the piston 14 at or adjacent to the open end of the cylindrical shell. By raising the handle 37 to draw the piston upwardly in the cylinder the lubricant is drawn into the cylindrical chamber until the same is filled or substantially filled with lubricant. The high pressure casing 5 is then threaded upon the open end of the cylindrical shell, and pressure is exerted upon the handle 37 to force the piston 14 firmly against the lubricant contained in the cylindrical chamber with sufficient force to place the lubricant under substantial pressure. As the handle 37 is advanced to force the piston against the lubricant, the crosshead 38 engages the base plate 22 and forces the piston sleeve 10 into the lubricant, while the piston cups 16 and 17 are permitted to slide back on the piston sleeve against the pressure exerted by the spring 34. When the crosshead 38 is in engagement with the base plate 22, the coiled spring 30 holds the latch 27 in the position shown in full lines in Fig. 3 of the drawings where it is adapted to engage opposite sides of the guide member 6 to prevent movement of the base plate 22 on the guide arm 6 towards the right as viewed in Figs. 1 and 3, by reason of the side walls of the opening 28 engaging opposite sides of the guide member 6. In this way the lubricant in the cylindrical chamber is initially placed under pressure and such pressure may be maintained by forcing the handle 37 inwardly at intervals as lubricant is removed from the cylindrical chamber 1 through operation of the high pressure piston 49, or the combined force of suction caused by the removal of lubricant through the action of the high pressure piston 49 and the atmospheric pressure existing upon that side of the piston located at the right as seen in Fig. 1 may be relied upon for moving the piston 14 against the lubricant as lubricant is withdrawn by operation of the high pressure plunger 49. As the piston 14 is drawn or forced against the lubricant which is located at the left of the piston 14, as seen in Fig. 3 of the drawings, the pressure on the piston cup 17 and the resiliency of the spring 34 causes the piston cups 16 and 17 to be forced towards each other whereby the outwardly and inwardly extending flared portions of the piston cups, which are positioned opposite to the outer and inner washers 19 and 18 respectively, force the washers 19 and 18 radially outwardly and inwardly with a force which increases proportionally with the force exerted upon the piston to increase automatically the closeness of the fit between the washers 19 and 18 and the inner wall of the cylinder and the outer wall of the piston sleeve 10 respectively. In this way increased pressure between the piston and lubricant automatically results in increasing the closeness of the fit between the piston and the cylinder wall and piston sleeve to prevent escape of lubricant past the piston.

It will be understood that when the handle 37 is moved outwardly away from the cap 4 the crosshead 38 is moved out of engagement with the base plate 22 and into contact with the latch 27, which is raised out of locking engagement with the guide member 6 and into the dotted line position as shown in Fig. 3, where the latch contacts with the inturned end 32 of the lug 31 to hold the latch from moving sufficiently to engage the guide member 6 in the opposite direction and thus allow free movement of the piston on the guide member in either direction when the latch is in this position.

As the piston 14 is placed under pressure by the coiled spring 34 as above described, the piston cups 16 and 17 are forced together and their annular curved shapes tend to compress the inner and outer annular washers 18 and 19 slightly and to force the inner washer 18 inwardly toward the piston sleeve and the outer washer 19 outwardly towards the wall of the cylindrical shell, thus more effectively acting as seals to prevent the escape of lubricant past the piston.

When the lubricant has been drawn into the cylindrical chamber as above described and placed under pressure either by forcing the piston 14 thereagainst or by the combined action of suction and atmospheric pressure within the cylinder, the lever 52 may be moved into its dotted line position, as shown in Fig. 1, when the plunger 49 will be partially withdrawn from the transverse passage in the high pressure casing and a portion of the lubricant which is under pressure in the cylindrical casing 1 will be forced into the passage 44 in front of the plunger 49. The apparatus may then be applied to a fitting to be lubricated and the lever 52 returned to its full line position, as shown in Fig. 1, when the lubricant in the transverse passage will be forced under high pressure to the passages 46 and 47 past the check valve 55 and into the bearing to be lubricated.

While I have shown a connection 48 threaded into the high pressure casing and having a threaded portion 58 for connection with any one of the usual forms of flexible tubing employed in devices of this character, the connection 48 may be construed for direct application to a fitting to be lubricated, or when a flexible connecting tubing is employed the check valve may be positioned in the fitting connection at the opposite end of the flexible tubing if desired, the employment or omission of a flexible tubing between the high pressure chamber and the fitting to be lubricated being entirely optional as well as the location of the check valve for preventing return of the lubricant through the passages 47 and 46 when the plunger 49 is again withdrawn from the transverse passage.

By means of the enlarged portion 44 of the transverse passage the lubricant under pressure in the cylindrical chamber 1 readily flows into the enlarged portion 44 of the passage upon retraction of the plunger 49, and the provision of a compressible gasket 50 at the end of the plunger causes a slight radial expansion of the gasket 50 as the plunger is forced inwardly thus producing a close fit between the gasket 50 and the wall of the passage 42 and insuring that none of the lubricant will flow back past the plunger under the high pressure to which the lubricant is subjected by the plunger. After the lubricant in the chambers 44 and 42 is forced past the check valve 55 by the high pressure plunger 49, the plunger 49 is retracted, when suction in the chambers 44 and 42 act to draw lubricant into these chambers from the cylindrical chamber 1 through the opening 45. This suction effect tends to draw the piston 14 towards the left, as seen in Fig. 1 of the drawings, by reason of the atmospheric pressure existing in that portion of the cylindrical shell 1 located at the right of the piston 14 as seen in Fig. 1 of the drawings.

It will be understood of course that the handle 37 may be forced inwardly also toward the cap 4 at such intervals as may be necessary in order to maintain the lubricant in the cylindrical chamber 1 constantly under pressure, and this pressure is maintained by means of the latch 27 which prevents movement of the base plate 22 towards the right as seen in Figs. 1 and 3, while the coiled spring 34 exerts constant pressure upon the piston 14 to force the piston cups 16 and 17 towards each other and thus prevent escape of lubricant past the piston 14.

Even in the absence of pressure applied at intervals to the handle 37, the piston 14 will follow closely after the lubricant as it is withdrawn from the cylindrical shell 1 through the combined effect of suction upon one side of the piston and atmospheric pressure on the other, and any tendency for the lubricant to escape past the piston will be resisted by reason of the spring 34 acting to force the gaskets 18 and 19 inwardly and outwardly, respectively, to more effectively seal the passages about the piston.

While the guide member 6 is shown herein as stationary, that is, immovably secured to the cap 4, it may be slidably mounted in the cap 4 and my improved combined piston and latching means employed therewith, and means other than the slidable rods 35 and 36 may be employed for moving the combined piston and latching mechanism within the cylinder may be employed if desired.

In that form of the invention shown in Figs. 4 and 5 of the drawings the cylindrical shell 1, cap 4 and high pressure casing 5 are similar in all respects to those previously described, as well as the guide member 6, parallel rods 35 and 36, handle 37 and crosshead 38 for moving the piston within the cylinder. In this construction, however, the piston sleeve 60, provided with oppositely positioned heads 61 and 62, is somewhat shorter in length than the piston sleeve 10 previously described, and a washer 63 which may be formed of compressible material is positioned between the piston 64 and the base plate 22, instead of the coiled spring 34 shown in Figs. 1 to 3 inclusive. The base plate 22 is provided with upstanding lugs 24 and 25 spaced from each other and having positioned therebetween an abutment 26 adapted to engage one end of the latch member 27. The latch member 27 is provided with an opening 28 for receiving the guide member 6 as in the form previously described. A pin 29 is passed through the lugs 24 and 25 and carries a coiled spring 30 for engaging the latch member as in the form shown in Figs. 1, 2 and 3 of the drawings.

The piston 64 comprises oppositely positioned piston cups 65 and 66, which like those previously described are of annular curved construction whereby the central and peripheral portions thereof are spaced from each other a greater distance than those portions which are radially intermediate the central and peripheral portions of the cups, and the central and peripheral portions of the cups are inclined or flared outwardly relative to each other for the reception of annular washers. Inner and outer annular washers 67 and 68 are positioned between the piston cups 65 and 66 which washers may be formed of any suitable material but which are preferably somewhat compressible so that upon pressure being exerted upon the piston cups to force them towards each other the washers 67 and 68 will be expanded radially so as to contact more closely with the sleeve 60 and the cylinder wall whereby the escape of lubricant past the piston is rendered more difficult.

The operation of this form of the invention is similar to that previously described in that the lubricant is adapted to be drawn into the cylindrical casing and placed under pressure therein in the same manner as that previously set forth in connection with those forms of the invention shown in Figs. 1 to 3 inclusive. The latch member 27 operates in the same manner as that previously described to prevent free movement of the piston towards the right, as shown in Figs. 4 and 5, while permitting the same to be drawn towards the right upon movement of the handle 37 by releasing the latch as the crosshead 38 contacts therewith. Thus lubricant may be drawn into the cylindrical chamber 1 by first removing the high pressure casing 5, placing the then open end of the cylindrical casing in the lubricant and drawing the handle 37 outwardly. The high pressure casing 5 may then be threaded upon the cylindrical shell and the piston 64 may be forced down against the lubricant by exerting pressure on the handle 37. As lubricant is withdrawn from the cylindrical chamber 1 through operation of the plunger 49, the vacuum set up through the retraction of the plunger 49 together with the atmospheric pressure existing upon the right hand side of the piston 64, as seen in Fig. 4, causes the piston 64 to follow the lubricant and move toward the left in Fig. 4, so that it remains in close contact with the lubricant. The latch 27 engages the guide member 6 to prevent movement of the piston towards the right as seen in Fig. 4, and any increase in pressure upon the piston causes the cup members 65 and 66 to move towards each other and thus force the washers 67 and 68 radially inward and outward to more closely engage the outer surface of the sleeve 60 and the inner surface of the cylindrical wall thereby preventing the escape of lubricant past the piston.

While I have shown and described one form which my invention may assume in practice it is to be understood that various changes may be made in the form, proportions and arrangements of the parts without departing from the spirit and scope of the invention as set forth in the appended claims which are to be broadly construed in the light of my disclosure.

What I claim is:—

1. A lubricating apparatus comprising a lubricant chamber, a piston movably supported in said chamber, a guide member for guiding said piston in its movement within the chamber, means for locking said piston against movement in one direction relative to said guide member, and manually actuated means extending without said chamber for positively moving said piston in one direction without releasing said locking means and for effecting the release of said locking means to permit movement of the piston in the opposite direction.

2. A lubricating apparatus comprising a lubricant chamber, a piston movably supported in said chamber, a stationary guide member for guiding said piston in its movement within the chamber, means for locking said piston against movement in one direction relative to said guide member, and common means extending within said chamber for moving said piston in either of two directions relative to said guide member and for effecting the release of said locking means during the movement of the piston in one direction.

3. In a lubricating apparatus, a lubricant chamber, a high pressure lubricant chamber, provided with an enlarged central portion and reduced end portion and having a lubricant opening connecting said lubricant chamber with the enlarged portion of said high pressure chamber, and a plunger mounted for slidable movement in said high pressure chamber and provided with a portion which is expansible radially under pressure.

4. In a lubricating apparatus, a lubricant chamber, a high pressure lubricant chamber provided with an enlarged central portion and reduced end portion and having a lubricant opening connecting said lubricant chamber with the enlarged portion of said high pressure chamber, and a plunger slidably mounted in said high pressure chamber and provided with an end gasket radially expansible under pressure to fit closely within the reduced portion of said chamber.

5. In a lubricating apparatus, a lubricant chamber, a guide member having a portion located within said lubricant chamber, a combined piston and locking means therefor positioned within said chamber, said locking means normally restraining the movement of said piston in one direction relative to said guide member, and manually operated means located outwardly of said chamber for releasing said locking means.

6. In a lubricating apparatus, a lubricant chamber, a guide member having a portion located within said lubricant chamber, a piston positioned within said chamber and movable relative to said guide member, means effective in all positions of said piston relative to said guide member for locking said piston against movement in one direction relative to said guide member, means for releasing said locking means, and means for positively moving said piston in either direction relative to said guide member.

7. In a lubricating apparatus, a lubricant chamber, a guide member having a portion located within said chamber, a piston in said chamber slidable relative to said guide member, means for locking said piston to said guide member in all positions of the piston relative to said guide member for holding the piston against movement in one direction, and common means for disengaging said locking means and moving said piston in either direction relative to said guide member.

8. In a lubricating apparatus, a lubricant chamber, a guide member having a portion located within said chamber, a combined piston and locking means therefor mounted for movement relative to said guide member, a spring pressed latch normally engaging said guide member to restrain the movement of said piston in one direction, means for engaging said latch member to effect its release from the guide member, and a stop for limiting the movement of said latch member.

9. A lubricating apparatus comprising a lubricant chamber, a piston slidably mounted in said chamber, a guide member for guiding said piston in its movement within said chamber, manually actuated means having a portion located outwardly of the lubricant chamber for moving said piston in either direction relative to said guide member, and locking means carried by a portion of said piston and effective in all positions of the piston for limiting the movement of the piston in one direction relative to said guide member while permitting free movement of the piston in the opposite direction.

10. In a lubricating apparatus, a lubricant chamber, a guide member located within said chamber, a piston sleeve, a piston slidably mounted upon said sleeve and comprising oppositely positioned annular piston cups spaced from each other and capable of limited movements towards and from each other, and compressible annular washers located between said piston cups adjacent to the inner wall of the chamber and the outer surface of the sleeve respectively which are adapted to be forced against the inner wall of the chamber and the outer surface of the sleeve upon movement of the piston cups towards each other.

11. In a lubricating apparatus, a cylindrical lubricant chamber, a member axially positioned within said chamber, a piston slidably mounted upon said axial member and comprising oppositely positioned annular cup members each provided with concentrically arranged flaring portions located adjacent their outer and inner edges, and annular washers positioned between the corresponding flaring portions of said cup members for contact with the axial member and the wall of said chamber respectively, said washers being adapted to expand radially against the axial member and the inner wall of the chamber upon the application of pressure to one of said cup members.

12. In a lubricating apparatus, a lubricant chamber, an axial guide member, a piston movably mounted in said chamber and comprising oppositely positioned spaced cup members mounted upon the said axial guide member and movable relative to each other and each provided with outwardly inclined inner and outer edges, spaced annular expansible elements positioned between the inclined inner and outer edge portions of said cup members and expansible radially in opposite directions upon the application of pressure to said cup members for moving said cup members towards each other, and spring means engaging one of said cup members for effecting a substantially uniform radial expansion of each of said expansible elements.

13. In a lubricating apparatus, a lubricant chamber, a guide member having a portion located within said chamber, a piston slidably mounted on said guide member, means carried by said piston for engaging said guide member in all positions of said piston relative to said guide member for locking the piston against movement in one direction relative to the guide member, and common means for moving said engaging means out of engagement with said guide member and for moving said piston relative to said guide member.

14. In a lubricating apparatus, a lubricant chamber, a guide member having a portion located within said chamber, a piston slidably mounted on said guide member, a pivoted latch member carried by said piston and movable to engage said guide member, and common means for moving said latch member out of engagement with said guide member and moving said piston relative to said guide member.

15. In a lubricating apparatus, a lubricant chamber, a guide member located within said lubricant chamber, a combined unitary piston and locking means therefor slidably mounted on said guide member, and manually operated means for moving said piston in either direction relative to said guide member, initial movement of said manually operated means in one direction serving to release said locking means prior to imparting movement to said piston.

16. In a lubricating apparatus, a lubricant chamber, a guide member having a portion located within said chamber, a piston slidably mounted on said guide member, a latch means carried by said piston for releasably engaging said guide member to lock the piston against movement in one direction relative to said guide member and means for positively moving said piston in either direction relative to said guide member.

In testimony whereof I have affixed my signature.

RAYNALDO P. JACQUES.